Sept. 25, 1951  F. A. KING  2,569,006
REELING MECHANISM
Filed July 25, 1947  2 Sheets-Sheet 1
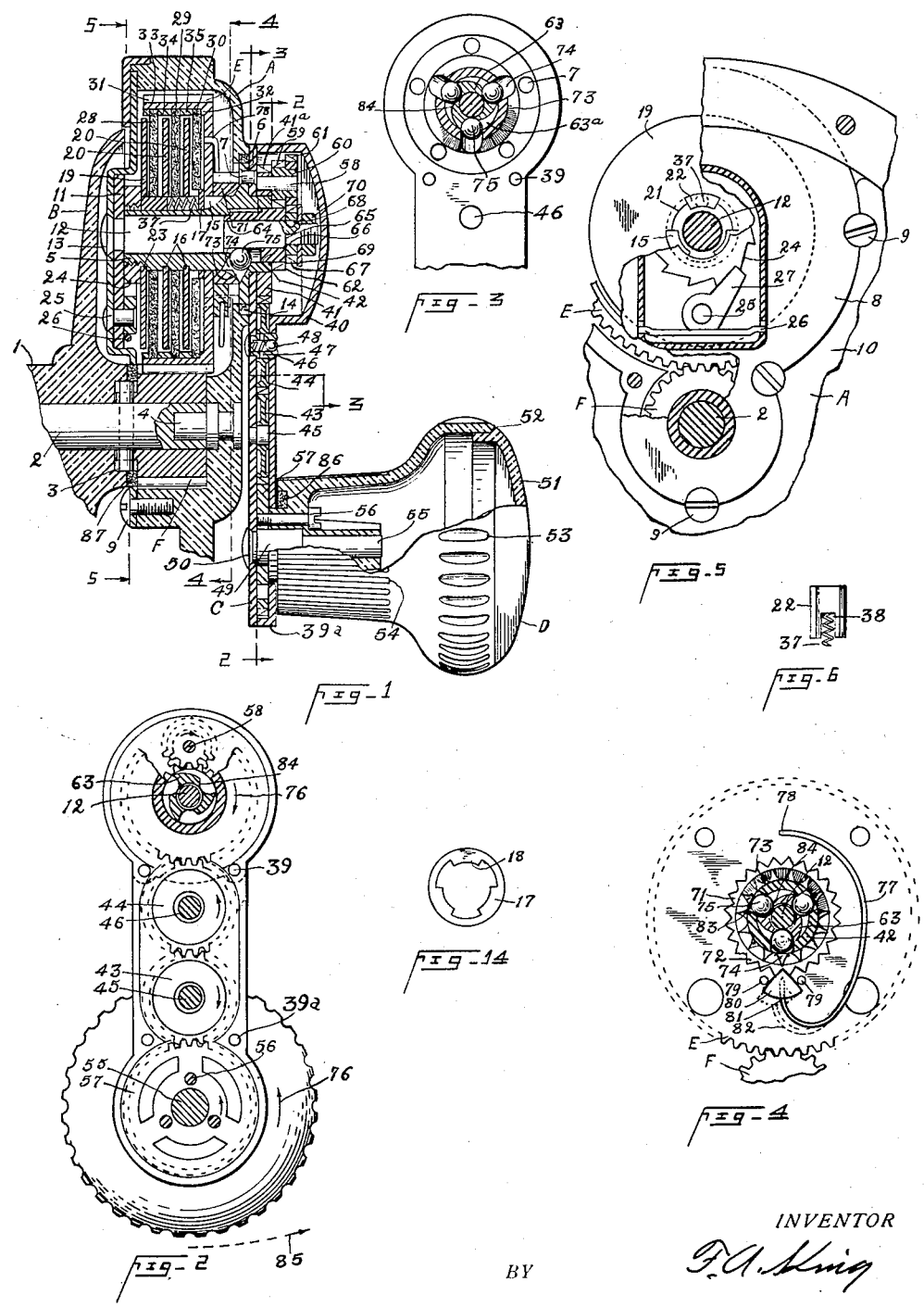
INVENTOR
F. A. King
ATTORNEY

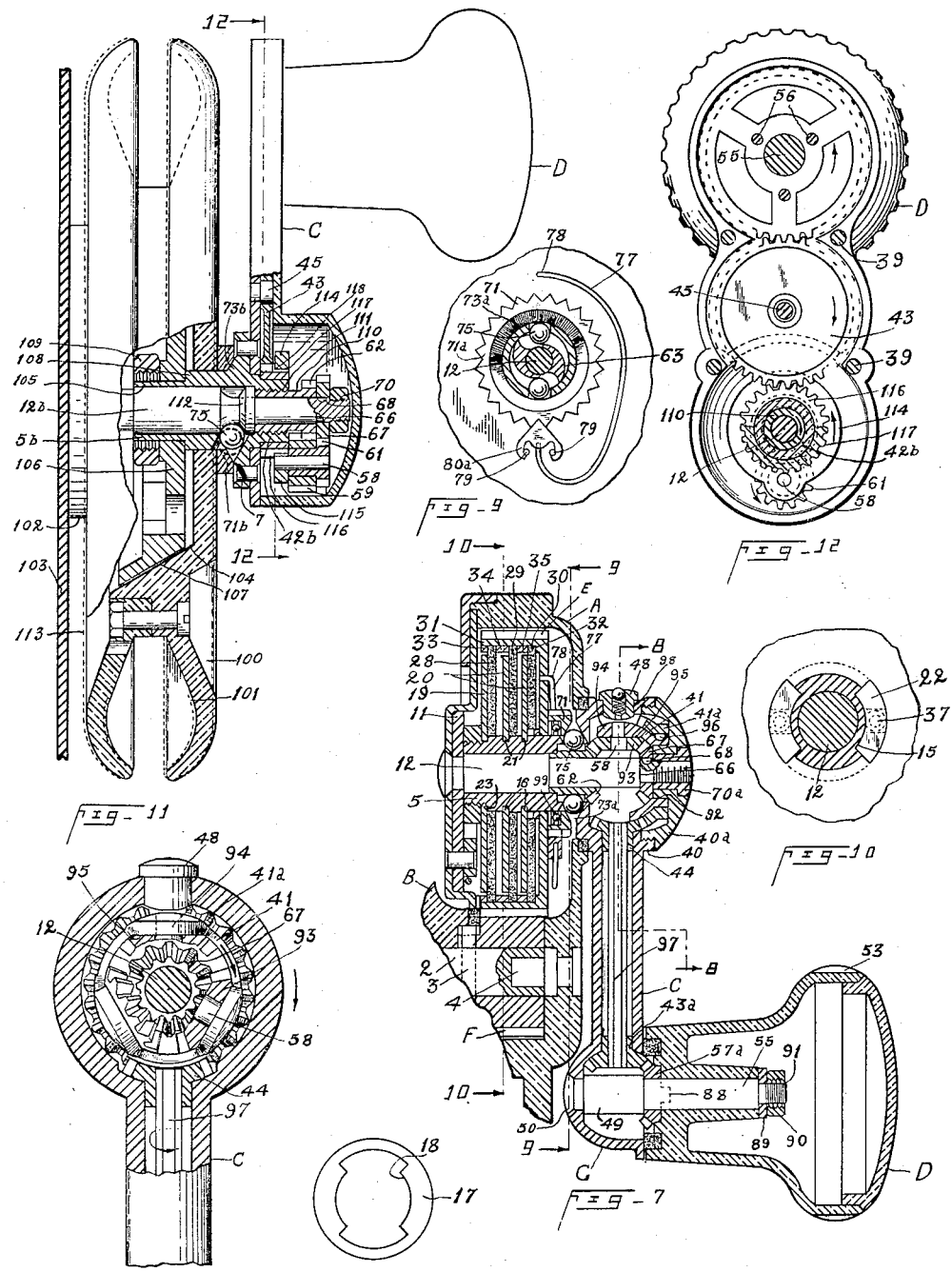

Patented Sept. 25, 1951

2,569,006

UNITED STATES PATENT OFFICE 2,569,006

REELING MECHANISM

Frank A. King, deceased, late of Los Angeles, Calif., by William Scott King, Tujunga, and Ernest Lynn King, Los Angeles, Calif., and A W. Tedstrom, Parsons, Kans., administrators, assignors to Mary L. King, Tujunga, Calif.

Substituted for abandoned application Serial No. 520,111, January 28, 1944. This application July 25, 1947, Serial No. 763,653

12 Claims. (Cl. 244—84.6)

This application is filed in place of abandoned application, Serial No. 520,111, filed January 28, 1944.

This invention relates to reeling mechanism for crank operated reels of various types, and more particularly to fishing reels, as shown in United States Letters Patent No. 2,054,823 issued September 22, 1936, and contemplates further improvements in the cranking mechanism of the type described therein.

The general object of this invention is to provide a mechanism of this type which is in practical form for driving a spool direct without the employment of planetary or compound gears, thus including an independent crank handle clutch adjusting gear train of relatively low velocity ratio and slow moving cams associated with clutch actuating balls carried by the crank.

The main object of this invention is the provision of means to transmit, at will, independent movement to an element carried by a rotatable crank during rotation by direct gear connection with an external source of power.

A most important object of this invention is to provide a manually controlled gear in mesh with a planetary or differential gear train, including a relatively stationary fixed gear provided with intermediate members in connection with an element which normally rotates as a unit with a rotatable crank shank, thus eliminating the employment of two dependent or co-acting gear trains as heretofore employed.

Another object of this invention is to provide means to control longitudinal movement of a combined click and clutch element on a rotatable crank shank during rotation of the latter.

It is an object of this invention to provide a hand controlled gear in mesh with a differential gear train having a semi-floating intermediate member in connection with an element which normally rotates as a unit with a rotating element.

Heretofore, many attempts have been made to control excessive free running of the spool in casting the line from the conventional fishing reel which usually employs some sort of disengaging dogs or gears for free spool action. In such reels, the spool tends to over-run the line by reason of excessive free spool rotation in lieu of co-operating with the declining lateral momentum of the line.

It is, therefore, an important object of this invention to provide cranking mechanism which inherently affords suitable and necessary impedimenta to facilitate casting the line without back lash.

In the conventional laminated disk clutch unit, as used heretofore for free spool operation, it has been found that the multiple disks thereof adhere to each other by capillary attraction of oil therebetween, or if the reel is accidentally tilted from a balanced position the disks frictionally slide against each other, by reason of their own gravity. Therefore, it is an important object of this invention to provide the novel construction of a spring suspensory thrust bearing which tends to maintain the disks in a suspended separated position during the casting operations for free movement of the parts. Another object of this invention is the construction of a toothed click ring which is operable through the medium of the suspensory bearing.

With these and other more detailed objects and advantages in view, the invention comprises certain novel constructions, combination and arrangements of parts as will be subsequently specified and claimed. Referring to the drawings wherein like reference characters designate like parts throughout the several views:

Fig. 1 is a fragmental sectional view taken along the crank's axis and its pin, showing the clutch in the disengaged position, some parts being shown in elevation.

Fig. 2 is a sectional view through the crank arm taken along the line 2—2 of Fig. 1.

Fig. 3 is a fragmental view taken along the line 3—3 of Fig. 1.

Fig. 4 is a view taken along the line 4—4 of Fig. 1 showing the click ring in elevation.

Fig. 5 is a view taken along the line 5—5 of Fig. 1.

Fig. 6 is a disassembled view of a key part.

Fig. 7 is a view showing the same clutch and click mechanism in its engaged position but a modified form of adjusting gear train.

Fig. 8 is a detail sectional view taken on the line 8—8 of Fig. 7.

Fig. 9 is a detail view taken on the line 9—9 of Fig. 7, showing a modified form of click mechanism.

Fig. 10 is a detail view taken on the line 10—10 of Fig. 7.

Fig. 11 is a sectional axial view of another embodiment of this invention, showing it applied to an antenna reel.

Fig. 12 is a view taken on the line 12—12 of Fig. 11 showing the adjusting gear train.

Figs. 13 and 14 are views showing the suspensory bearings disassembled from the structures shown in Figs. 7 and 1, respectively.

Referring to Figs. 1 and 10 inclusive of the drawings more specifically, there are illustrated two modifications of the improved cranking mechanism applied to the driving system of a conventional type fishing reel. It is seen that such a reel includes a recessed head plate A, to which is connected a corresponding tail plate on the opposite side of the reel by pillars and reel seat not shown, as they form no part of this invention.

Supported on the head plate A is a spool B, having a tubular hub 1 receiving a shaft 2 keyed thereto as at 3 and journaled in the head plate A by the trunnion 4.

A crank C is mounted on the end plate A for operating the spool B and at the end thereof, opposite the crank handle D, is provided a hollow crank shank 5 having a flanged outer end 6 secured to the crank C by rivets 7, or otherwise.

As shown in Fig. 5, there is provided a cover or bridge plate 8 secured by means of screws 9 to the inner wall 10 of the recessed head plate A. The plate 8 is centrally deformed to receive a reinforcement piece 11, and these two parts are united by a shouldered crank post 12 which is riveted as at 13.

The post rotatably supports the shank 5 and extends through an opening in the outer wall of said head plate, wherein is positioned an oil seal washer 14 abutting the periphery of the flange 6.

The shank 5 is formed with segmental shaped splines 15 running in the direction of its length and spaced 120° apart. Such splines are of a combined width equal to half the circumference of the shaft, therefore half of the peripheral surface therebetween is removed. The remaining peripheral portion left between the splines 15 is provided with multiple series of spaced annular channels 16, running lateral to the splines 15.

In accordance with this invention, as best shown in Figs. 1 and 7, a combined frictional clutch and drag unit is mounted on the shank 5 for drivingly connecting and disconnecting the crank C with an element to be driven thereby.

In this instance this element comprises an open-faced drum-like clutch gear E, in mesh with the spool gear F, keyed to shaft 2 by key 3.

For application to the clutch unit E, various suitable forms of mechanism may be adapted according to the exigencies of the work which the clutch unit and the cranking mechanism are to perform.

Abutting the inner face of gear E is a clutch releasing collar 17, provided with inwardly projecting segmental shaped keys 18 as shown in Figs. 13 and 14 corresponding to said splines 15. There are provided multiple resilient disks, 19, 20—20 made of spring brass, or other suitable material, formed with inwardly projecting keys 21 as shown in Fig. 5, similar to keys 18 but corresponding in depth to the channels 16. In assembly, the keys are slid into the splines 15 until they register with said channels 16, wherein they are rotatively shifted to provide clearance in the splines 15 for reception of segment keys 22, the latter being of suitable length to rigidly lock the central portion of keys 21 in said channels 16.

The reduced inner end of shank 5 forms a stop shoulder 23, flush with the inner face of disk 19 and a left-hand threaded ratchet nut 24 is turned thereon, abutting the shoulder 23 and the disk 19.

Obviously, anticlockwise torsional stress of the crank shaft will tend only to lock these parts in their respective places by means of the left-hand threaded engagement and the pawl 27, the latter preventing left-hand rotation of the shank 5 and its connected crank.

Interiorly of the clutch gear E, a series of frictional fiber disks, 28, 29, and 30 are provided, which are alternately interposed relative to said disks 19, 20—20, respectively, and the fiber disks 28 and 29 are provided with suitable central apertures which serve as bearings for the open or rim portion 31 of the clutch gear E.

The outer marginal edge of disk 30 is supported by a spacer stop shoulder 32 on gear E and the disks 28, 29 and 30 are alternately spaced between a retainer ring 33, spacer rings 34 and 35 and the spacer stop shoulder 32. The said fiber disks and the retainer ring 33, and spacer rings 34 and 35, are united with the clutch gear by a suitable press fit therein, or otherwise.

There is provided the novel construction of a suitable compression spring 37, interposed between each of the segment keys 22 and the clutch bearing 17; the keys are provided with elongated recesses 38, as shown in Fig. 6, for this purpose. Such springs have a limited resiliency just sufficient to release the clutch unit, thus providing a multiple spring cushion or suspensory bearing 17, the latter of which sustains the gear E in a longitudinally suspended or resilient state for free spool action, the aperture of disk 30 being slightly enlarged to permit free longitudinal movement of the bearing 17 therein.

In the line casting operation, the rotational movement of the clutch gear E is relatively slow, owing to the reversed multiplying gear action thereof. Obviously, a slight frictional resistance is produced by the bearings of this rotating assembly. Such frictional resistance affords the advantageous impedimenta necessary to retard excessive rotational speed of the spool, in accordance with the declining lateral movement of the line being cast so as to prevent back-lash.

As seen in Fig. 2, screws 39 secure to the crank C a cover plate 39a, having an integral hub cap end 40 which covers a planetary or differential gear mechanism including a gear carrier 41 having carrier gear teeth 41a. The outer end of shank 5 is formed with a boss-like hub 42, on which the carrier 41 is supported for rotational movement in either direction with respect to the shank 5.

In this instance, the crank C includes two idler gears, 43 and 44, which are rotatably retained in position by means of shouldered pins 45 and 46 press fitted in the crank C, the latter pin 46 is cross-bored at 47 for oil passage and also axially bored wherein is inserted a spring pressed ball oil seal 48. The idler gears 43 and 44 serve to lengthen the gear train to a suitable cranking length and to reverse the rotational direction of the carrier 41, the purpose of which will later be described.

Adjustable drag actuating means, as shown in Figs. 1, 7 and 11, consists of a shouldered crank pin 49 carried on the outer end of crank C and attached thereto as at 50 by riveting or otherwise which is adapted to rotate in a hollow handle D.

It will be noted that the handle is designed as a knob including an outer dome-like end cap 51, having a flared peripheral stop shoulder 52, while flutes 53 and 54 serve to facilitate torsional hand grasp thereof.

The handle D is retained on the reduced end 55 of pin 49 by means of screws 56 threaded in the gear 57 which is rotatably supported on the pin 49 beneath the cover 39a and retained therein by the overlap of the latter.

The carrier 41 is apertured wherein is press fitted an eccentric pinion carrier shaft 58 that rotatably supports a planetary gear 59, having an integral shank 60 over which a larger gear 61 is united therewith by press fit and serrations not shown.

For convenience of illustration only one eccentric pinion shaft is shown, however multiplicity may be employed if desired.

It will be noted that the hollow of the outer end of shank 5 is enlarged and a corresponding portion of the post 12 is reduced in diameter, thus providing an elongated annular cam chamber 63a for the reception of a sleeve shaped ball actuating gear 62 having integral cams 63, best shown in Fig. 2, and a boss shaped inner end 64 which is freely rotatable over the post 12. The boss 64 serves as a bearing in the hollow of the shaft while the outer end is supported by a cylindrical portion 65 in said chamber for rotation with the shaft as a unit thereof, or with respect thereto.

Abutting shoulder 66 and the cam gear 62 is a relatively stationary sun gear 67 fixed to the post 12 by means of key 68, lock washer 69 and in turn the nut 70, the latter of which is threaded over the outer end of said post. The washer 69 is of sufficient width to overlap the gear 61 so as to retain the latter on the shaft 58.

There is provided the novel construction of an automatic click ring 71 having peripheral teeth 72. The inner face of flange 6 and the outer side of ring 71 are formed with beveled portions 73 which correspond with each other and the shank 5 is drilled out at an angle thereto, thus providing angular ball channels 74 which intersect said cam chamber 63a.

The channels 74 carry clutch actuating balls 75 which are interposed between the beveled faces 73 of the ring 71 and the cams 63.

As shown in Fig. 2 the gears 57, 43 and 44 are in mesh with each other respectively and the carrier gear 41 is in mesh with gear 44, gear 61 is in mesh with the stationary gear 67 and in turn the gear 59 is in mesh with the gear 62.

With reference to Fig. 2 it will be seen, as indicated by the arrows 76, that right hand rotation of the handle D with respect to the crank will impart left hand rotation to the gear 62 and its integral cams 63.

Obviously, such rotation of cams 63 functions to force the balls 75 radially and angularly outward so that the balls 75 will co-act with the beveled face 73 to shift the ring 71 and the gear E and its united disks inwardly into frictional engaging relation with the disks 19, 20—20.

A series of compression springs 37 seated in the recess 38 abut the releasing bearing 17 and thereby co-act with the collar to disengage the clutch disks 28, 29 and 30 when the cams 63 are released by left rotation of the handle D.

It will be observed that the peripheral support of disks 28, 29 and 30 and the central support of disks 19 and 20—20 will permit a slight lateral deflection under the urge of cams 63 and through their effected parts. The resiliency of the disks alike therefore, this deflection is accordingly uniform assuring a uniform frictional contact throughout their co-acting surfaces.

As illustrated in Fig. 4, the outer face of gear E includes an involute curved click spring 77 having a right angle bent at upper end 78 and press fitted in an aperture in the outer face of gear E and at its opposite end the two guide pins 79—79 are secured to the gear in the same manner. A quadrantal shaped click pawl 80 is provided with a socket in its arc 81 to receive the lower curved end of spring 77 which serves to retain the click 80 between the guide pins 79—79 in the path of the click teeth 72.

As indicated by dotted line 82, the click coacts with the teeth 72 by sliding tangentially outward as it is guided by the pins 79—79 but drops from tooth to tooth so as to produce a clicking sound only when the clutch is functioning as a drag.

The outwardly facing internal surface of ring 71 is scalloped at the converging edge of the beveled surface 73, thus providing ball grooves 83 which radiate out over said surface. Such grooves conform to the curvature of the balls which shift therein when under the urge of cams 63 and thereby prevent rotation of the ring with respect to the shank 5. Yet the gear E is permitted to rotate on the shaft and carry with it the click 80 which co-acts with the teeth 72 so as to produce a clicking sound, indicating that the clutch is functioning as a drag.

When the cams 63 are moved in reverse direction to that which is indicated by the arrow 76, the springs 37 tend to separate said fiber disks from said metal disks and thereby coincidentally force the balls 75 radially inward, thus disengaging the latter from the grooves 83. The balls are then retained in their respective positions by means of the hook-shaped heel portions 84 of the cams 63 thus permitting the click to cease operating through the medium of its spring 77 which tends to carry the ring 71 with the gear E as an inactive part thereof.

Referring now to Fig. 2 let it be assumed that the clutch is disengaged and that the handle D is secured in the operator's hand and the crank is given one complete swing about the fixed gear 67 in a right-hand direction as indicated by the arrow 85. The effect is to drive the gear 41 in advance of the crank shaft at a one to one ratio. Gear 41 carries with it the pinion shaft 58 on which rotates the united gears 59 and 61 the latter of which is thereby rolled around the fixed gear 67 in a direction of travel opposite to that which is indicated by the arrow 76 and carries with it the gear 59. Gear 59, being of half the diameter of its mate 62, functions as a compensating gear in a planetary manner to equalize said advanced ratio to that of the crank shank 5 so that the gear 62 may normally rotate in unison with the shank until adjustments are to be made.

Assuming now that the handle D is given a substantial right turn, irrespective of crank rotation but relative to the fixed gear and in a direction as indicated by the arrows 76, then the gear train above described will function in a reverse direction to operate the cams 63 as indicated by the arrow 76.

As stated and as illustrated in Figs. 3 and 4 this rotational movement of the cams 63 functions through the medium of the balls 75 to shift the click ring and the clutching member E inwardly to its frictional engaging position, as best shown in Fig. 7. In consideration of the foregoing, it will be seen that the click ring is capable of three distinct functions which are as follows: to co-act with the click pawl 80 when the line is being carried out by the fish under drag tension, to cease operating during cranking operations and to remain disengaged and silent when casting the line.

Felt washer oil seals 86 and 87 are interposed between the inner end of handle D and the crank C and the spool B and the gear F, respectively. The periphery of seal 87 abuts the aperture of bridge plate 8 whereby the washers 14, 86 and 87 serve to retain suitable lubricant therein for the gearing and the clutch unit E which is effected by the viscosity of the lubricant. Obviously, a light line requires light lubricant while a heavy line and bait require heavy lubricant, then assuring cooperation between the drag unit E and the line for antibacklash performance in casting the line.

With reference to Fig. 7, there is shown the features of the cranking mechanism embodied in a bevel gear structure comprising a shank 5 formed integral with a tubular crank C having a hollow cylindrical hub 40 and a cup shaped gear housing G which carries the pin 55 and houses a pair of miter gears 43a and 57a, one of which is fixed to the handle D as indicated by the dotted lines 88. These parts are rotatably carried on the pin 55 by means of a lock washer 89 and a screw-threadedly engaged nut 90, the pin 55 being diametrically flattened and threaded for this purpose as at 91.

The crank C is rotatably secured on the post 12 by means including an externally threaded dome-like cap 40a threaded into the hub 40 and provided with an inner boss 92 centrally counterbored from the outer side through which the post extends, including a shouldered nut 70a in the counterbore and threadedly engaged with the post. A bevel gear 67 is fixed to the post by means of the shoulder 66, key 68 and the nut 70a.

The novel construction of a semi-floating pinion carrier or spider ring 41 is provided which is adapted to surround multiple planetary beveled pinion gears 93. The ring 41 is provided with integral arcuate ears 94 having inwardly facing bearing surfaces 95 which have secured thereto radial pinion shafts 58, over which are loosely mounted the multiple compensating pinion gears 93, the latter being in mesh with the cam gear 62 and the fixed gear 67. The outer end of spider ring 41 is rotatably supported on the boss 92 and it is adapted to be driven thereon by means including a ring gear 41a which is press fitted over the ring 41 and keyed thereto by key 96.

From the drawings it will be seen that radial pressure of gears 93 is sustained by the ears 94 and the same will be equalized about the beveled teeth of gear 62 as thrust pressure from the latter will be sustained by the nut 70a.

In mesh with the ring gear 41a is a pinion gear 44 which is connected to a miter gear 43a in the housing G by means of a hexagon shaft 97 which in assembling is entered through an opening 98 in the hub 40 and pressed through the gears 44 and 43a so as to form driving connection therebetween, such opening 98 is closed by means of a spring pressed ball oil seal unit 48.

Numeral 99 designates an anti-friction thrust bearing assembly positioned in a provided recess 75 in the click ring 71 adjacent gear E. As these parts are operating under torsional pressure, obviously the frictional resistance therebetween is much less than at its beveled face 73a and its cooperative contact surface with the actuating balls 75, therefore the frictional resistance of the bearing 99 being the lesser is overcome by the greater which also exceeds that of the click spring 77 and its click 80a so as to cause the latter to operate automatically. The click head 80a is slightly modified in that it is designed to rock on the pins 79—79 in lieu of sliding.

Obviously, rotation of the handle with respect to the fixed gear 67 will effect longitudinal movement of the ring 71 and its associated balls 75 through the medium of the train of gears including the miter assembly 57a, 43a and gears 44, 41a, 67, 93, 62, the shaft 97 and the cams 63.

The pitch diameter of the miter gears is equal to gear 44 which is half that of gear 41a, therefore the gear carrier 41 is driven in advance of the crank at a ratio equal to one half to one of the crank. Since gear 62 is coupled to rotate with the crank through the medium of balls 75 and the carrier 41 and its gear 41a rotate one-half revolution for each full turn of the crank, the planetary gears 93, while traveling around fixed gear 67, due to both their travel and axial rotation, will travel around gear 62. Consequently, there is no disengagement of the clutch during normal cranking. When the crank is not turned and handle D is rotated to make adjustments, the balls 75 are forced outwardly freeing gear 62 to be driven through the gear train one to one with the handle.

As seen in Figs. 11 and 12, the mechanism of the invention is embodied in a reel for aircraft radio antenna. In this form of the invention the spool 100 is similar to a pulley having a peripheral winding groove 101 of arcuate cross section and is mounted for free rotation on a hollow crank shank 5b, similar to shank 5 and driven by the crank C. This shank 5b is rotatable on a fixed post 12b and a suitable plate 102 secured to a support 103.

The back central portion of spool 100 is formed with a cup-shaped cavity having a tapered annular wall 104. In this instance the inner end of shank 5b is provided with diametrically flatted surfaces 105 and the remaining peripheral surface thereof is threaded. The latter supports for rotation, the body portion or the center 106 of a coniformed clutch unit 107 conforming to the cavity wall 104. The latter is retained on the shaft by means of shoulder 108 and nut 109.

The crank is attached to the shank as before described but differs therefrom in that the crank arm carries but one idle gear, 43.

In this instance, gear 62 is formed with a hollow stub shaft 110, having left hand screw-threaded engagement as at 111 with the hub 42b. The said cam chamber carries a beveled faced ring 112, the opposite face of which abuts the inner end of shaft 110 and it is loosely fitted on the said reduced portion of the post 12b for axial movement thereon, whereby to shift the balls 75 radially and angularly outward in their respective channels and thus forcing the ring 112 and the spool 100 inwardly as indicated by the dotted line 113 to frictional engagement with the coniform clutch element 107.

As seen in Fig. 12, the carrier constitutes a ring 114 having an arcuate extension 115 to support the shaft 58, the latter of which carries the gear 61. In this instance, the latter is of half the pitch diameter of its mate, the fixed gear 67. This carrier is driven by a spur gear 116 having an annular section of its teeth 117 cut away down to its pitch line, thus forming a shoulder 118 which abuts the inner face of the carrier 114. This carrier is formed with internal teeth conforming to said section of cutaway teeth which section is press fitted therein.

In this instance, gear 59 is of equal diameter to gear 62 and of double gear thickness thereto, so as to permit of longitudinal movement of the latter in its screw-threaded engagement with the hub 42b for actuating the balls 75.

Obviously, rotation of the handle with respect to the fixed gear will effect longitudinal movement of the ring 71b and its associated balls 75 through the medium of the train of gears 57, 43, 116, the latter of which is driven in reverse direction to the crank during cranking operation and at one to one ratio so as to reversely roll gear 61 about the fixed gear, but inasmuch as the diameter of gear 61 is less than its united gear 59 the latter serves to back gear the gear 62 to a ratio equal to the crank so that the screw-threaded end of gear 62 may rotate as a unit therewith or with respect thereto, so as to shift the ring 112 inwardly and thereby force the balls radially outward against the beveled face 73b which in turn shifts the spool 100 and its coniformed cavity 104 into frictional engagement with its associated element 107.

From the foregoing it is thought to be clearly illustrated that gears 93 and 59—61 serve as compensating gears to provide cooperative movement of the parts in each of the modified forms of the embodiment of this invention. Such movements serve to provide neutral cranking position of the handle D so that it may be swung about the post 12 in a normal neutral position for cranking the reel, yet be movable at the will of the operator to make adjustment of the parts carried thereby.

While there have been shown and described specific embodiments of the invention, it is not intended to be limited to the exact details of construction set forth and the invention embraces such changes, modifications and equivalents of the parts and their formation and arrangement as come within the purview of the appended claims.

Having thus described the invention, what is claimed and desired to secure by Letters Patent is:

1. In a cranking mechanism, frictional driving and driven elements, a crank directly connected to one of said elements for rotating it in a direction corresponding to that of the crank, a handle rotatable on the crank, a simple gear train carried by said crank and driven by and upon rotation of said handle, a planetary gear drive mounted on one of the gears of said train and responsive thereto, and means responding to said planetary gear drive for moving one of said elements into driving contact with the other element.

2. In a cranking mechanism, frictional driving and driven elements, a crank directly connected to one of said elements for rotating it in a direction corresponding to that of the crank, a handle rotatable on the crank, a simple gear train carried by said crank and driven by and upon rotation of said handle, a planetary gear drive mounted on one of the gears of said train and responsive thereto, and means responding to said planetary gear drive for moving one of said elements into driving contact with the other elements, including a cam member, a shiftable click-ring abutting said one element, and shiftable balls interposed between said cam member and said ring for shifting the latter and moving said one element into driving contact with said other element.

3. In a cranking mechanism, frictional driving and driven elements, a spring urging said elements apart, a crank directly connected to said driving element for rotating it in the same direction as the crank, a handle rotatable on the crank, a simple gear train carried on said crank arranged to operate respective to rotation of said handle, a planetary gear drive operating about the axis of the crank responsive to said gear train, and means responsive to the planetary action of said planetary gear drive for moving said driven element into and releasably holding it in driving contact with said driving element.

4. In a cranking mechanism, frictional driving and driven elements, a spring urging said elements apart, a crank directly connected to said driving element for rotating it in the same direction as the crank, a handle rotatable on the crank, a simple gear train carried on said crank arranged to operate respective to rotation of said handle, a planetary gear drive operating about the axis of the crank responsive to said gear train, and means responsive to the planetary action of said planetary gear drive for moving said driven element into driving contact with said driving element against the force of said spring.

5. In a cranking mechanism, frictional driving and driven elements, a spring urging said elements apart, a crank directly connected to said driving element for rotating it in the same direction as the crank, a handle rotatable on the crank, a simple gear train carried on said crank arranged to operate respective to rotation of said handle, a planetary gear drive operating about the axis of the crank responsive to said gear train, and means responsive to the planetary action of said planetary gear drive for moving said driven element into and releasably holding it in driving contact with said driving element, said means including a rotary cam member and shiftable means responding to said cam member for moving said driven element into contact with said driving element against the force of said spring.

6. In a cranking mechanism, frictional driving and driven elements, a spring urging said elements apart, a crank directly connected to said driving element for rotating it in the same direction as the crank, a handle rotatable on the crank, a simple gear train carried on said crank arranged to operate respective to rotation of said handle, a planetary gear drive operating about the axis of the crank responsive to said gear train, a cam member driven by said planetary drive means, and means responding to said cam member for moving said driven element into and out of contact with said driving element against the force of said spring.

7. In a cranking mechanism, a post, a support therefor, a crank, a shank projecting laterally from said crank and mounted for rotation on said post, a frictional driving member fixed on said shank for rotation therewith, a frictional driven element axially movable on said shank into and out of contact with said driving element, a rotary handle on said crank and means responding to the turning of said handle for moving said driven element into driving contact with said driving element.

8. In a cranking mechanism, a post, a support therefor, a crank, a shank projecting laterally from said crank mounted for rotation on said post, a frictional driving member fixed on said shank for rotation therewith, a frictional driven element axially movable on said shank into and out of contact with said driving element, a rotary handle on said crank and means responding to the turning of said handle for moving said driven element into and releasably holding it in driving contact with said driving element, said means including a planetary gear drive means and shiftable thrust means interposed between said driven element and said planetary gear drive means and responsive thereto to move said driven member into and out of contact with said driving member.

9. In a cranking mechanism, a post, a support therefor, a crank, a shank projecting laterally from said crank mounted for rotation on said post, a frictional driving member fixed on said shank for rotation therewith, a frictional driven element axially movable on said shank into and out of contact with said driving element, a rotary handle on said crank and means carried by said shank including a rotary cam responsive to the turning of said handle for moving said driven element into driving contact with said driving element.

10. In a reel mechanism having a frame and a spool mounted for free rotation in said frame, a clutch unit including a hollow member rotatably connected with said spool, a first set of clutch elements carried by and in the hollow of said member, a sleeve extending axially through said hollow member, a second set of clutch elements carried by the sleeve and alternating with the elements of the first set, a crank for rotating the sleeve and the clutch elements thereon, a rotational handle on the crank, a gear, ball means normally coupling the gear and the sleeve, a gear train operatively connecting said handle and gear for rotating the latter independently of turning of the crank, and a wedge element adjacent the hollow member and mounted on said sleeve for axial movement under wedging pressure of said ball means, when said handle is rotated independently, to axially move the hollow member and frictionally engage the two sets of clutch elements.

11. The structure according to claim 10, that includes spring means normally holding said sets of clutch elements apart and adapted to yield to the pressure exerted by the ball means.

12. In a reeling mechanism, a post, a crank having a hub engaged over the post and rotatable on the axial center of the post, a spool, a clutch unit mounted on and outside of the hub and concentric with the axis of the post, said clutch unit interconnecting the crank and spool, a turnable handle on the throw end of the crank, and means interiorly of said hub and also concentric with the axis of the post and responsive to rotational movement of said handle for connecting and disconnecting said clutch unit.

WILLIAM SCOTT KING.
ERNEST LYNN KING.
A W. TEDSTROM.

*Administrators of the Estate of Frank A. King, Deceased.*

REFERENCES CITED

The following references are of record in the file of this patent:

UNITED STATES PATENTS

| Number | Name | Date |
| --- | --- | --- |
| 1,623,236 | De Roo | Apr. 5, 1927 |
| 1,905,483 | Maynes | Apr. 25, 1933 |
| 1,943,981 | Maynes | June 16, 1934 |
| 2,054,823 | King | Sept. 22, 1936 |
| 2,162,726 | King | June 20, 1939 |
| 2,219,322 | King | Oct. 29, 1940 |